(12) United States Patent
Cowley et al.

(10) Patent No.: US 10,001,305 B2
(45) Date of Patent: Jun. 19, 2018

(54) FLUID TREATMENT APPARATUS AND METHOD

(71) Applicant: Vexo International (UK) Ltd, London (GB)

(72) Inventors: Richard Antony Cowley, Milton Keynes (GB); Darren Lee Wilkinson, Milton Keynes (GB)

(73) Assignee: Vexo International (UK) Ltd, London (GB)

( * ) Notice: Subject to any disclaimer, the term of this patent is extended or adjusted under 35 U.S.C. 154(b) by 196 days.

(21) Appl. No.: 14/773,336

(22) PCT Filed: Mar. 6, 2014

(86) PCT No.: PCT/GB2014/000084
§ 371 (c)(1),
(2) Date: Sep. 5, 2015

(87) PCT Pub. No.: WO2014/135837
PCT Pub. Date: Sep. 12, 2014

(65) Prior Publication Data
US 2016/0018144 A1   Jan. 21, 2016

(30) Foreign Application Priority Data
Mar. 6, 2013   (GB) .................................. 1304043.1

(51) Int. Cl.
*F25B 47/00*   (2006.01)
*F25B 43/00*   (2006.01)
(Continued)

(52) U.S. Cl.
CPC ........ *F25B 43/006* (2013.01); *B01D 21/0009* (2013.01); *B01D 35/18* (2013.01);
(Continued)

(58) Field of Classification Search
CPC ......... F25B 43/006; B03C 1/286; B03C 1/10; B03C 1/30; B01D 21/0009; B01D 29/05; B01D 21/26; B01D 35/06; F24D 19/0092
(Continued)

(56) References Cited

U.S. PATENT DOCUMENTS 2,548,400 A * 4/1951 Shepard ................. B01D 29/52
                                                210/323.2
4,563,982 A * 1/1986 Pischinger ............. F02M 25/00
                                                123/1 A
(Continued)

FOREIGN PATENT DOCUMENTS

FR   2566283   12/1985
FR   2793427   11/2000
(Continued)

*Primary Examiner* — Ana Vazquez
(74) *Attorney, Agent, or Firm* — Lightbulb IP, LLC (57) ABSTRACT

Apparatus for use in a treatment of fluid in a fluid circuit of a heating or cooling system. A vessel (102) defines an open upper end (104), a circulating fluid inlet port (104) in a side wall (105) thereof and a fluid outlet port (106) in a lower end (107) thereof, the lower end (107) providing an internal floor of the vessel (102) and the fluid outlet port (106) open to the internal floor of the vessel (102). The open upper end (103) of the vessel (102) is provided with a removable lid (108) that defines a dosing port (109) and an air vent port (110). A permanent magnet collector (112) for collecting magnetic particles on an external collection surface (113) thereof is removably locatable within the vessel (102). A method of treating fluid in a fluid circuit of a heating or cooling system.

20 Claims, 10 Drawing Sheets (51) Int. Cl.
*F24D 19/00* (2006.01)
*B01D 35/18* (2006.01)
*B01D 21/00* (2006.01)
*B03C 1/28* (2006.01)
*B23P 19/00* (2006.01)

(52) U.S. Cl.
CPC .............. *B03C 1/286* (2013.01); *B23P 19/00* (2013.01); *F24D 19/00* (2013.01); *F24D 19/0092* (2013.01)

(58) Field of Classification Search
USPC ........................................................ 210/695
See application file for complete search history.

(56) References Cited

U.S. PATENT DOCUMENTS

| | | | |
|---|---|---|---|
| 5,043,063 A | | 8/1991 | Latimer |
| 5,635,068 A | * | 6/1997 | Marandi ................ B01D 21/00 209/715 |
| 5,871,642 A | * | 2/1999 | Meeks .................... C02F 1/481 210/222 |
| 5,921,296 A | * | 7/1999 | Porter .................... B67C 11/02 141/331 |
| 6,277,280 B1 | * | 8/2001 | Houck ................. B01D 35/027 210/119 |
| 2011/0056875 A1 | * | 3/2011 | Stehle .................. B01D 29/605 210/172.1 |

FOREIGN PATENT DOCUMENTS

| | | |
|---|---|---|
| FR | 2862633 | 5/2005 |
| GB | 2469145 | 10/2010 |
| WO | WO9714502 | 4/1997 |
| WO | WO2008016934 | 2/2008 |
| WO | WO2012073029 | 6/2012 |

* cited by examiner

FLUID TREATMENT APPARATUS AND METHOD

FIELD OF THE INVENTION

The present invention relates to fluid treatment, in particular to apparatus for, and a method of, treatment of fluid in a fluid circuit of a heating or cooling system.

BACKGROUND OF THE INVENTION

Heating and cooling systems are known that comprise a fluid circuit through which a fluid circulates under pressure. An example of this type of system is a closed circuit central heating system, in which water flows in a loop from a boiler, through a series of hot-water radiators and then back to the boiler.

A problem with this type of closed circuit system is that the circulating fluid can become contaminated, resulting in a reduction in the performance efficiency of the heating or cooling system and possibly also leading to total system failure. The most common sources of contaminants in the circulating fluid are: corrosion, lime scale and microbiological growths (bacteria or fungi). Debris and sludge in the circulating fluid of a heating or cooling system can lead to blockages, leakage, and premature system failure. Approaches to addressing the problem of circulating fluid contamination include flushing of the system to remove any debris in the fluid circuit, and introducing a treatment additive, such as an inhibitor, into circulating fluid for the purpose of preventing or resolving contamination build-up.

A known device for introducing additives into the circulating fluid of a sealed commercial heating or chilled water system is a dosing pot. The dosing pot comprises a closed vessel that is connectable into the fluid circuit of the system and allows an additive to be received therein. With the dosing pot isolated from the fluid circuit, an additive is introduced into the vessel. The dosing pot is then opened into the fluid circuit to allow the additive to pass into the circulating fluid flowing through the vessel. The dosing pot is then isolated from the fluid circuit again, until such time as further dosing of the system is to be performed. This apparatus may therefore be perceived as 'normally closed' to the system fluid flow.

SUMMARY OF THE INVENTION

According to a first aspect there is provided apparatus arranged to be used in the treatment of fluid in a fluid circuit of a heating or cooling system, said apparatus comprising: a vessel defining an open upper end and comprising a lower end, the vessel defining a circulating fluid inlet port in a side wall thereof and a fluid outlet port in the lower end thereof, said open upper end of said vessel provided with a removable lid defining a dosing port and an air vent port; and a permanent magnet collector arranged to collect magnetic particles on an external collection surface thereof, said permanent magnet collector removably locatable within said vessel.

According to a second aspect there is provided a method of installing fluid treatment apparatus in the fluid circuit of a heating or cooling system, comprising the steps of: a) receiving apparatus according to the first aspect, b) locating said permanent magnet collector within said vessel, c) connecting said circulating fluid inlet port to a circulating fluid inflow conduit via an isolation valve, and d) connecting said fluid outflow port to a circulating fluid return conduit via an isolation valve, and to a drain conduit via an isolation valve.

According to a third aspect there is provided a method of treating fluid in a fluid circuit of a heating or cooling system, said method comprising the steps of: a) identifying apparatus according to the first aspect that is installed within the fluid circuit of the heating or cooling system following the method of the second aspect, and b) performing at least one of: (i) removing said permanent magnet collector from within said vessel, removing magnetic material collected on the external collection surface thereof and subsequently replacing the permanent magnet collector within said vessel; (ii) draining said vessel, introducing a fluid treatment additive into said vessel through said dosing port and subsequently allowing circulating fluid to flow through said vessel.

According to a fourth aspect there is provided a heating system comprising a fluid circuit provided with apparatus according to the first aspect.

According to a fifth aspect there is provided a cooling system comprising a fluid circuit provided with apparatus according to the first aspect.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures are not described in detail so as not to unnecessarily obscure the description.

Figure 1:
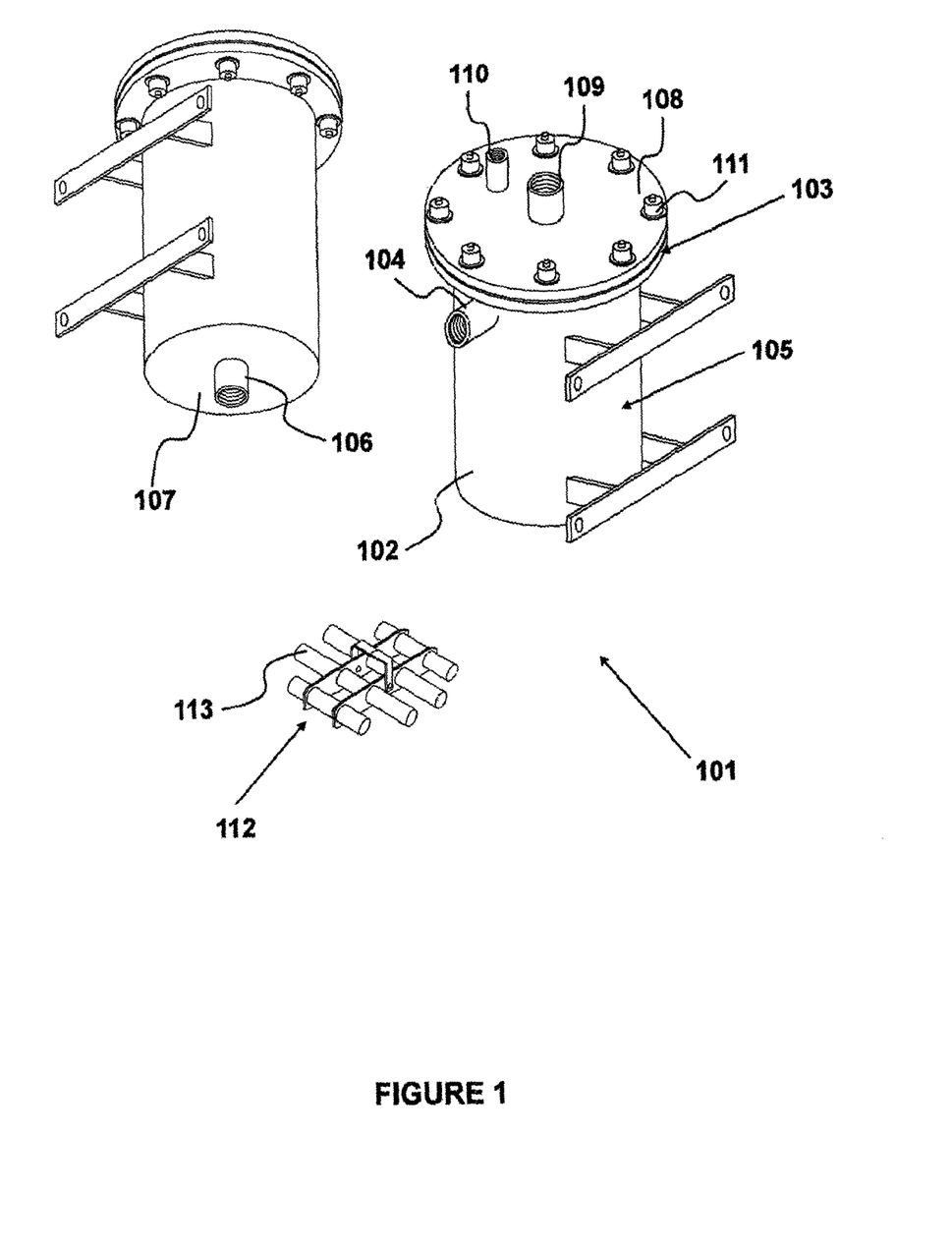
FIG. 1 shows apparatus for use in the treatment of fluid in a fluid circuit of a heating or cooling system.

FIG. 1

Apparatus 101 for use in the treatment of fluid in a fluid circuit of a heating or cooling system is shown in FIG. 1. Fluid treatment apparatus 101 comprises a vessel 102 that defines an open upper end 103, and a circulating fluid inlet port 104, in this embodiment in a side wall 105 thereof, and a fluid outlet port 106, in this embodiment, in the lower end 107 thereof. The open upper end 103 of the vessel 102 is provided with a removable lid 108 defining a dosing port 109 and an air vent port 110. In this Figure, the removable lid 108 is shown secured to the vessel 102. Any suitable fixing may be used to releasably secure the removable lid 108 to the vessel 102. In this illustrated embodiment, a plurality of mechanical fixings 111 is provided for this purpose.

Apparatus 101 further comprises a permanent magnet collector 112 for collecting magnetic particles on an external collection surface 113 thereof. The permanent magnet collector 112 is removably locatable within the vessel 102.

As will be described in further detail, the apparatus 101 is usable for dosing circulating fluid of a sealed heating or cooling system, and is advantageously additionally usable between dosing events as a filter for the circulating fluid of a sealed heating or cooling system. The apparatus 101 thus provides the dosing functionality of a known dosing pot and beneficially provides further functionality.

Figure 2:
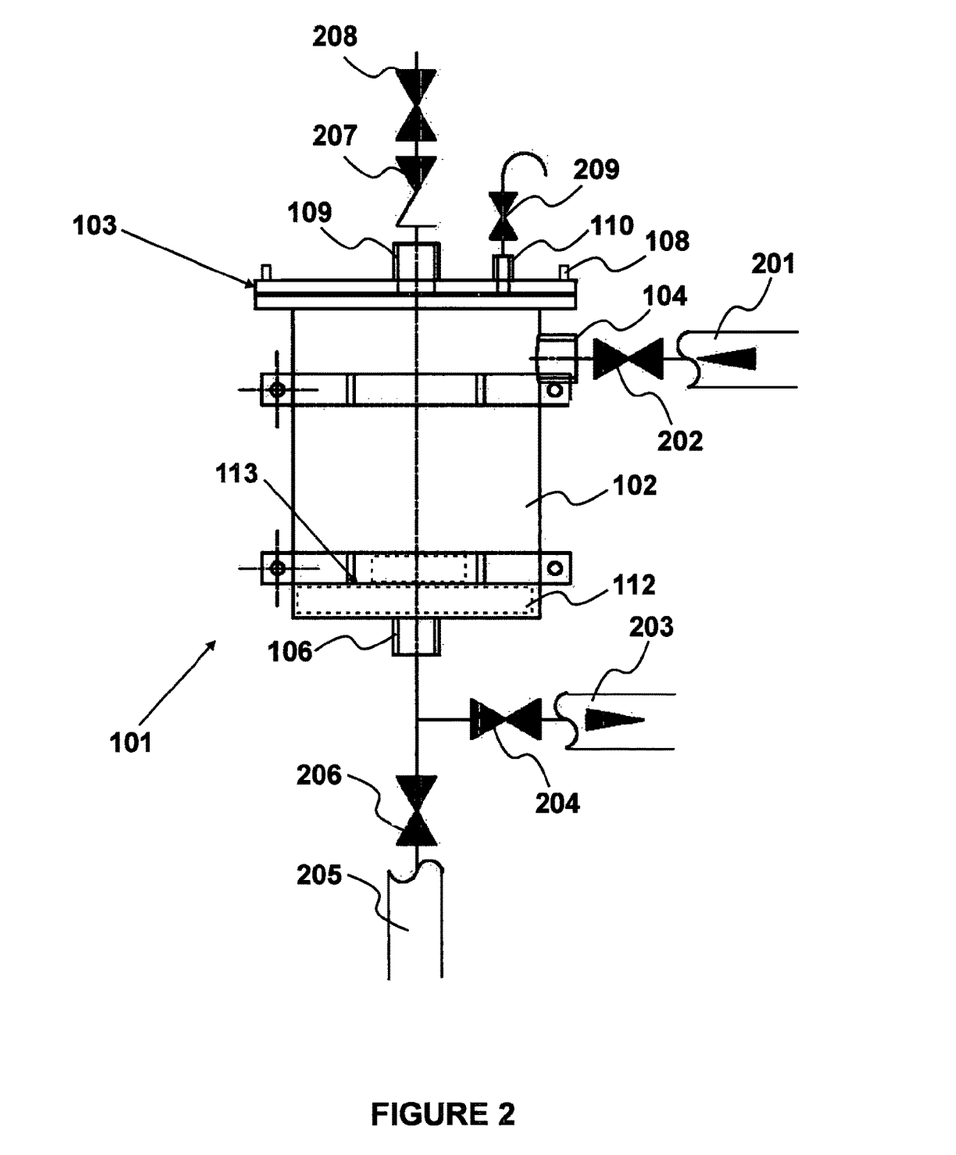
FIG. 2 shows a schematic of the apparatus of FIG. 1 installed for use.

FIG. 2

FIG. 2 shows the apparatus 101 installed for use in the treatment of fluid in a fluid circuit of a heating or cooling system.

In a method of installing the apparatus, the circulating fluid inlet port 104 is connected to a circulating fluid inflow conduit 201 via an associated isolation valve 202. The fluid outflow port 106 is connected to a circulating fluid return conduit 203 via an associated second isolation valve 204, and is connected to a drain conduit 205 via an associated isolation valve 206. The permanent magnet collector 112 is located within the vessel 102. In this Figure, the permanent magnet collector 112 is shown resting upon the internal floor of the vessel 102.

As shown in this Figure, the dosing port 109 is provided with a non-return valve 207, the purpose of which will be discussed below, and an associated third isolation valve 208 upstream of the non-return valve 207. The air vent port 110 is provided with an automatic air vent 209, the purpose of which will also be discussed below.

The installed apparatus 101 is usable for dosing the circulating fluid of the system as follows. The vessel 102 is isolated from the fluid circuit by means of the circulating fluid inlet port 104 and fluid outflow port 106 isolation valves 202, 204, 206 being closed. If required, to drain the vessel 102, the fluid outflow port 106 isolation valve 206 is opened to allow fluid within the vessel 102 to leave through the drain conduit 205; the drain conduit 205 is subsequently closed by returning the fluid outflow port 106 isolation valve 206 to the closed position. With the dosing port 109 isolation valve 208 open, a fluid treatment additive is then introduced into the vessel 102, via the non-return valve 207; the dosing port 109 isolation valve 208 is then subsequently closed. The circulating fluid inlet port 104 isolation valve 202 and the fluid outflow port 106 isolation valve 204 are then opened, to allow circulating fluid to flow through the vessel 102, from the inflow conduit 201 to the return flow conduit 203, to mix with the additive.

Therefore, in a method of treating fluid in a fluid circuit of a heating or cooling system, the vessel is drained, a fluid treatment additive is introduced into the vessel and circulating fluid is then subsequently allowed to flow through the vessel.

The installed apparatus 101 is usable for filtering the circulating fluid of the system as follows. The permanent magnet collector 112 is located within the vessel 102. The fluid outflow port 106 isolation valve 206 is closed, to close the drain conduit 205, and the fluid outflow port 106 isolation valve 204 and circulating fluid inlet port 104 isolation valve 202 are both opened, to allow circulating fluid to flow through the vessel 102, from the inflow conduit 201 to the return flow conduit 203. The circulating fluid flowing through the vessel 102 flows by the permanent magnet collector 112, which attracts any magnetic particles within the circulating fluid onto the external collection surface 113 thereof. In this way the permanent magnet collector acts as a filter, for magnetic particles. To remove collected magnetic particles from permanent magnet collector 112, the vessel 102 is isolated from the fluid circuit by means of the circulating fluid inlet port 104 and fluid outflow port 106 isolation valves 202, 204, 206 being closed. If required, to drain the vessel 102, the fluid outflow port 106 isolation valve 206 is opened to allow fluid within the vessel 102 to leave through the drain conduit 205; the drain conduit 205 is subsequently closed by returning the fluid outflow port 106 isolation valve 206 to the closed position. The removable lid 108 of the vessel 102 is removed, to open the vessel 102, and the permanent magnet collector 112 is removed from within the vessel 102, through the open end 103 of the vessel 102. With the permanent magnet collector 112 removed from the vessel, collected magnetic particles may be removed from the external collection surface 113 thereof; the cleared permanent magnet collector 112 is then placed back into the vessel 102. The circulating fluid inlet port 104 isolation valve 202 and the fluid outflow port 106 isolation valve 204 are then opened, to allow circulating fluid to flow through the vessel 102 again.

Therefore, in a method of treating fluid in a fluid circuit of a heating or cooling system, the permanent magnet collector is removed from within the vessel, magnetic material is removed from the external collection surface thereof, and the permanent magnet collector is subsequently replaced within the vessel.

It is thus to be appreciated that the apparatus 101 is suitable for dosing, and also filtering, of circulating fluid of a sealed heating or cooling system. The apparatus is suitable for dosing and filtering of circulating water of a heating or cooling system.

The non-return valve 207 of the dosing port 09 provides a safety feature. The non-return valve 207 acts to prevent fluid from exiting the vessel 102 through the dosing port 109, to avoid potential harm to an operative in attendance. At the time of a dosing event, the non-return valve 207 acts to prevent hazardous exit of fluid treatment additive that has been introduced into the vessel 102. As described above, circulating fluid is allowed to flow through the vessel 102 between dosing events. In the event that the dosing port 109 isolation valve 208 is opened while circulating fluid is flowing through the vessel 102, under pressure, the non-return valve 207 acts to prevent hazardous exit of circulating fluid from the vessel 102. The non-return valve 207 thus serves to prevent undesired splash-back or spurting of fluid out from within the vessel 102 that may cause an injury, such as an eye injury, to an operative in the vicinity thereof.

The automatic air vent 209 of the air vent port 110 functions to remove excess air, and is beneficially operational during a dosing event, when an operative is in attendance, and also while circulating fluid is flowing through the vessel 102, such as between dosing events when an operative may not be in attendance.

Figure 3:
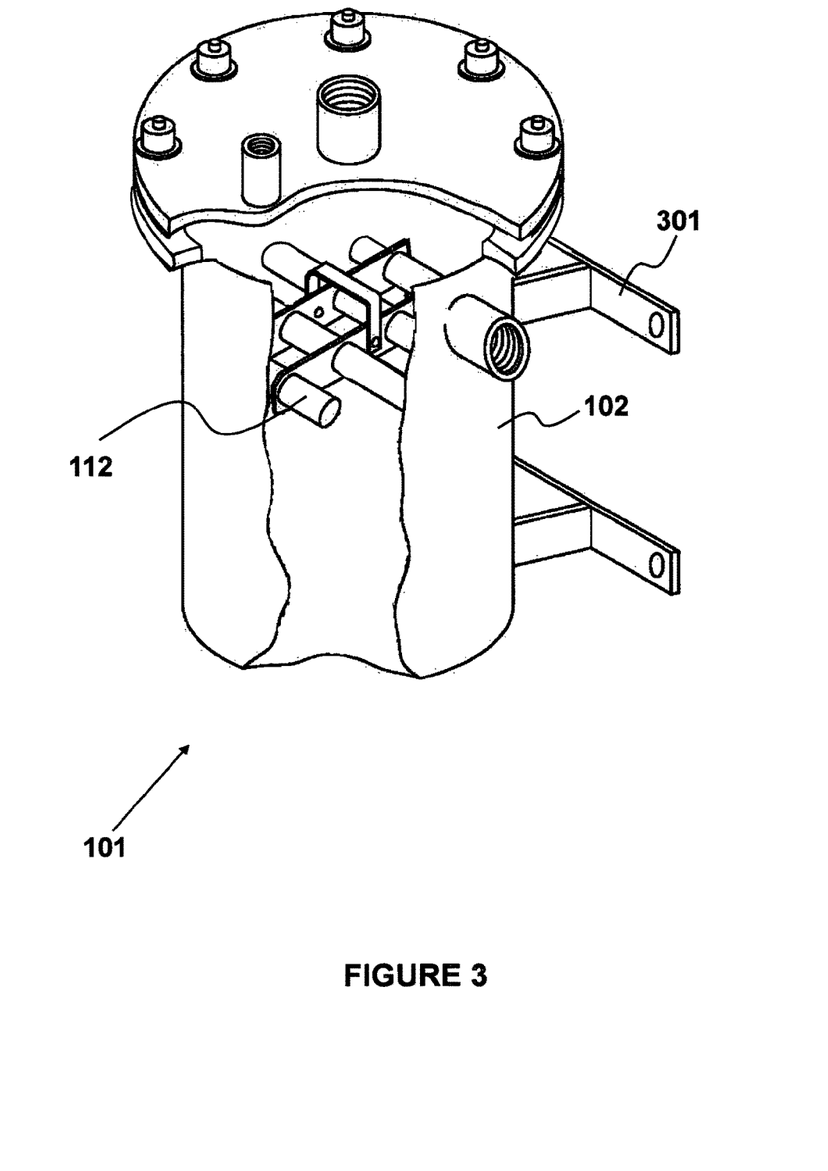
FIG. 3 shows the permanent magnet collector located within the vessel of the fluid treatment apparatus of FIG. 1.

FIG. 3

In FIG. 3, the permanent magnet collector 12 is located within the vessel 102 of the apparatus 101.

In this illustrated embodiment, the vessel 102 is provided with at least one bracket 301, for use in securing the vessel to a suitable support surface, typically a wall. Any suitable fixing may be used with the bracket 301.

The dimensions and shape of the vessel, and the ports, may vary between applications, and may vary depending on the specific heating or cooling system which with it is to be used. The capacity of the vessel determines the number of times that it will need to be filled during a dosing event to achieve the correct concentration of fluid treatment additive introduced into the circulating fluid of the heating or cooling system. The required volume of fluid treatment additive to be added, such as a chemical inhibitor, will vary according to the specific additive being used, the concentration of additive in the circulating fluid to be obtained and the specific size of the heating or cooling system.

As shown in this Figure, the vessel 102 has a circular cross-sectional shape. The vessel may be fabricated from any suitable material or combination of materials. In this illustrated embodiment, the vessel is fabricated from stainless steel, and is uncoated, at least internally.

Figure 4:
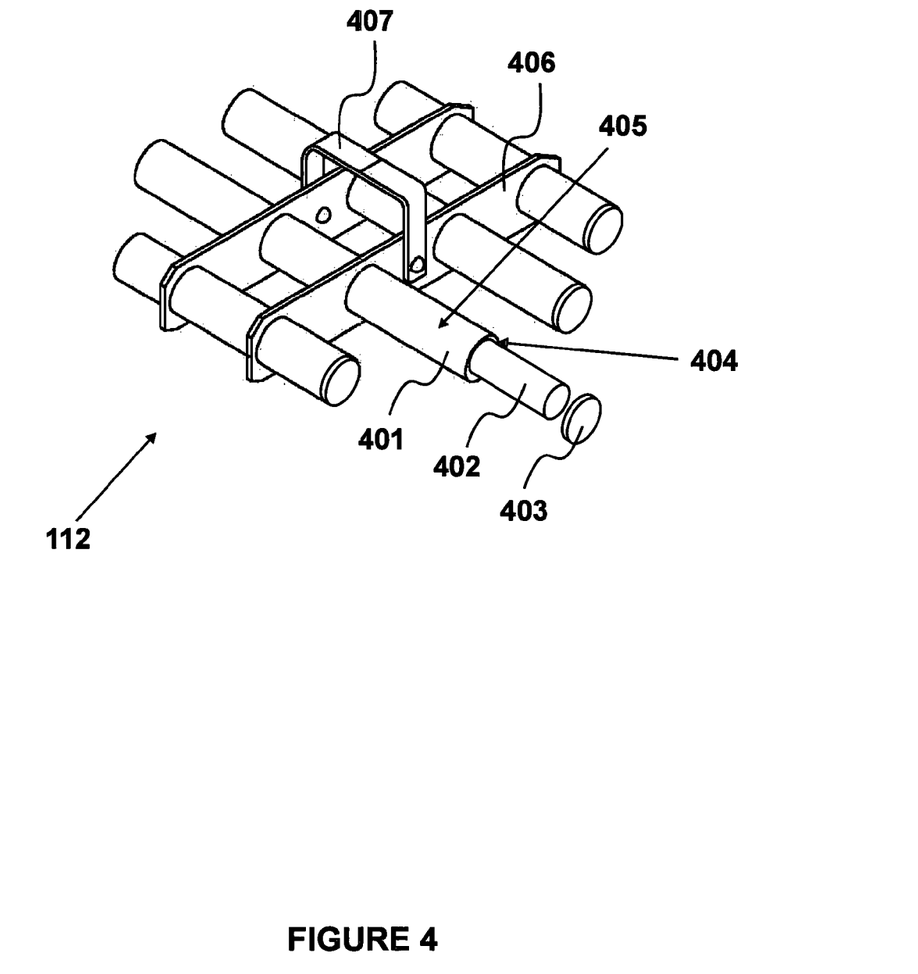
FIG. 4 shows the permanent magnet collector of FIG. 1 in further detail.

FIG. 4

FIG. 4 shows the permanent magnet collector 112 in further detail. The permanent magnet collector 112 comprises a plurality of tubular housings, each housing a permanent magnet, such as tubular housing 401 housing permanent magnet 402.

Preferably, and in this embodiment, at least one end of each of the tubular housings is provided with a removable cover, such as cover 403 of the end 404 of tubular housing 401, to allow the selective removal of the permanent magnet housed therein. In this embodiment also, the external collection surface 405 of each of the tubular housings, is a non-magnetic surface. This beneficially provides for magnetic particles collected on the external collection surface of a tubular housing to be removed by the process of removing the permanent magnet from within the tubular housing and allowing the magnetic particles to drop from the external collection surface of the tubular housing; the permanent magnet is then subsequently replaced inside the tubular housing. Alternatively, and in an embodiment in which the tubular housing is not provided with a means of allowing removal of the permanent magnet therein, the magnetic particles may be wiped from the external collection surface.

As shown, the tubular housings are relatively arranged in the form of a grate. In this illustrated embodiment, the grate arrangement comprises a pair of longer tubular housings disposed between shorter tubular housings, to complement a circular cross-sectional shape of a vessel with which the permanent magnet collector is to be used. The tubular housings are connected by at least one connector 406. In this example, the underside of the permanent magnet collector 112 is substantially planar.

Preferably, the permanent magnet collector 112 comprises a handle 406, to facilitate manual handling of the permanent magnet collector 102 during placement within a vessel and removal from a vessel.

It is to be appreciated that any suitable number of tubular housings containing a permanent magnet may be used, in any suitable arrangement. The dimensions and shape of tubular housings may also vary between applications. Components of the permanent magnet collector may be fabricated from any suitable material or combination of materials. In this illustrated embodiment, each of the tubular housings, each connector and the handle are each fabricated from stainless steel.

Figure 5:
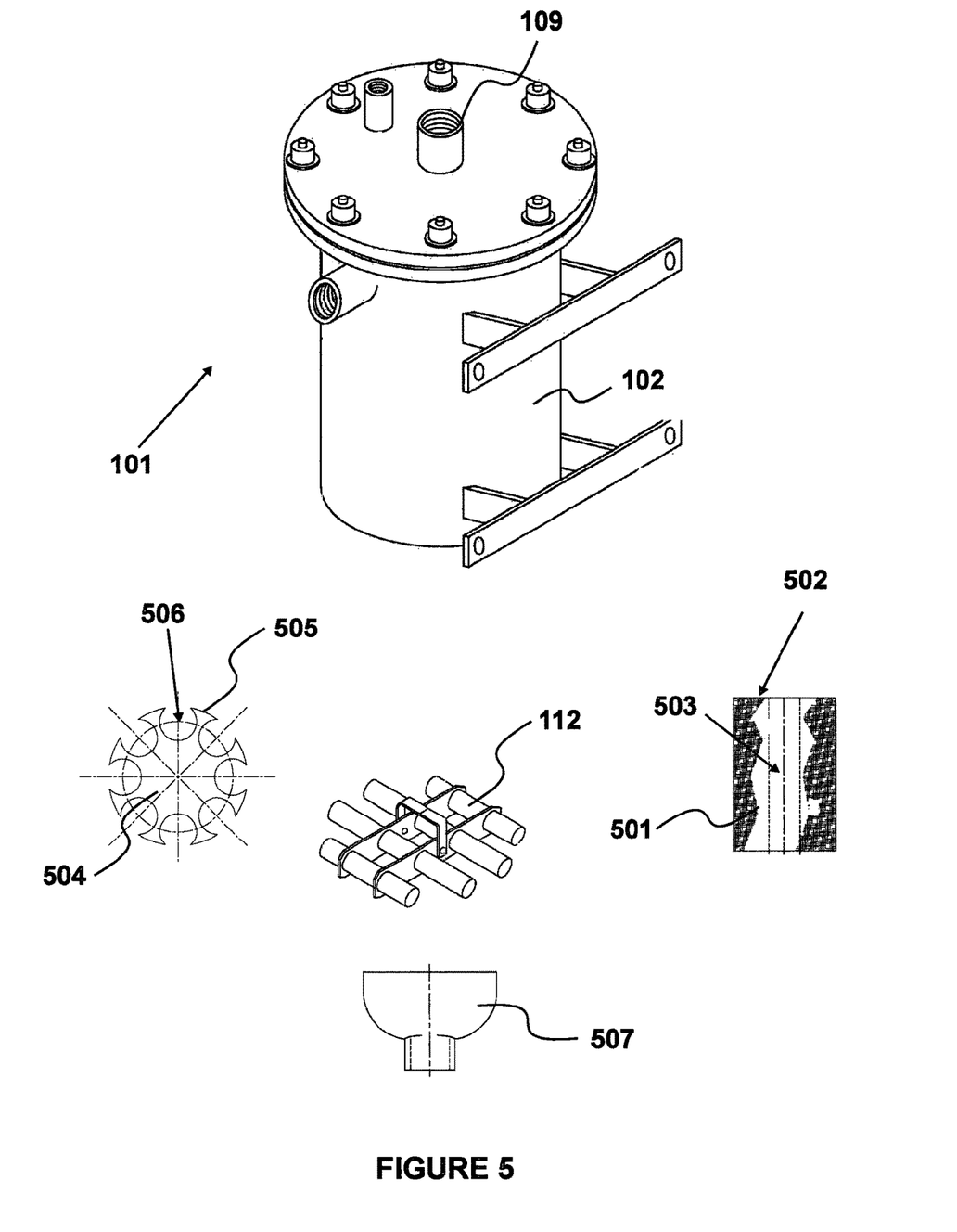
FIG. 5 shows further apparatus for use with the fluid treatment apparatus of FIG. 1.

FIG. 5

As shown in FIG. 5, the fluid treatment apparatus 101 may comprise additional components for use therewith.

The apparatus 101 may comprise a filter 501 that is removably locatable within the vessel 102. The filter 501 is provided for filtering non-magnetic particles from the circulating fluid of a heating or cooling system. The filter may comprise any suitable filtration media and will typically have a fluid filter rating in the range 5-100 micrometers. According to this illustrated embodiment, the filter 501 has a sealed top 502 and defines a hollow central core 503. The filter 501 is substantially circular, to complement a circular cross-sectional shape of a vessel with which the filter is to be used.

The apparatus 101 also further comprise a baffle plate 504 removably locatable within the vessel 102. The baffle plate 504 is substantially circular, to complement a circular cross-sectional shape of a vessel with which the baffle plate is to be used. The baffle plate 504 has a solid central portion 505 with an outer edge 505 that is profiled to provide cut-away portions, such as cut-away portion 506. In this embodiment, the baffle plate is fabricated from stainless steel. The baffle plate may however be fabricated from any suitable material or combination of materials.

The apparatus 101 may also further comprise a dosing funnel 507, releasably connectable relative to the dosing port 109 of the vessel 102. The dosing funnel may have any suitable shape and dimensions, and may be fabricated from any suitable material or combination of materials. In this embodiment, the dosing funnel is fabricated from stainless steel.

Figure 6:
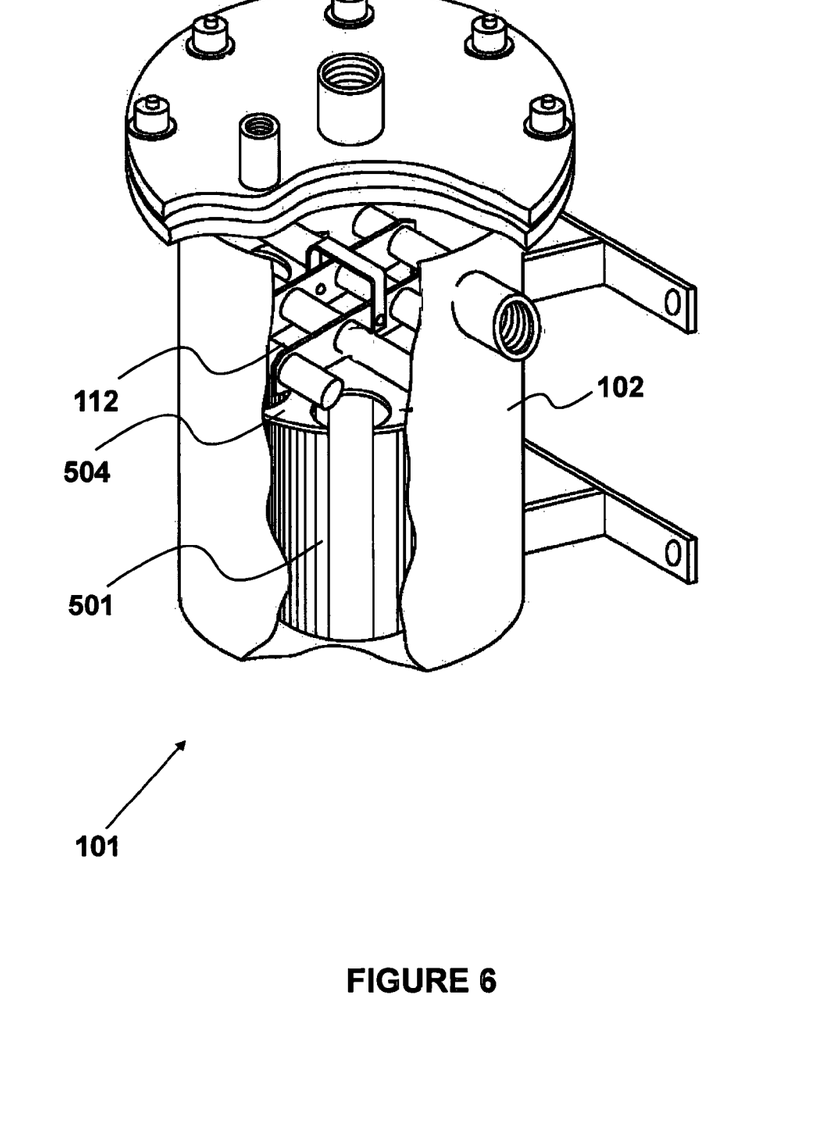
FIG. 6 shows the permanent magnet collector of FIG. 1, and the filter and baffle plate of FIG. 5, located within the vessel of the fluid treatment apparatus of FIG. 1.

FIG. 6

FIG. 6 shows the permanent magnet collector 112, filter 501 and baffle plate 504 located within the vessel 102 of the apparatus 101.

In a method of installing the apparatus, the filter 501 is placed into the vessel 102 first, the baffle plate 504 is then placed into the vessel 102 upon the filter 501, and then the permanent magnet collector 112 is placed into the vessel 102 upon the baffle plate 504. Thus, as shown in this Figure, the permanent magnet collector, filter and baffle plate are located within the vessel such that the filter is lowermost, the permanent magnet collector is uppermost and the baffle plate is located between the filter and the permanent magnet collector, such that circulating fluid flowing through the vessel passes the permanent magnet collector and subsequently passes through the filter. Thus, during filtering, the permanent magnet collector collects magnetic particles (such as magnetite, iron-oxide, metal debris) and the filter collects other particles (such as calcium deposits). The filter may be removed from the vessel and cleaned or replaced, as appropriate, by a similar process as that described for the removal, cleaning and replacement of the permanent magnet collector as previously described.

The weight of the baffle plate and permanent magnet collector upon the filter also serve to stabilise the filter in use.

It is thus to be appreciated that the apparatus 101 is suitable for dosing, and advantageously also filtering, of circulating fluid of a sealed heating or cooling system. The apparatus 101 may provide a single-stage filter function, provided by the permanent magnet collector, as described with reference to FIG. 3, or may provide a two-stage filter function, provided by the permanent magnet collector and the filter, as described with reference to FIG. 6.

The fluid treatment apparatus as described herein beneficially provides a vessel that can be used as a dosing pot for commercial heating and cooling systems, and that can beneficially be used as a filter for the circulating fluid of the system between dosing events. The apparatus as described herein may thus be 'normally open' to the system fluid flow.

Figure 7:
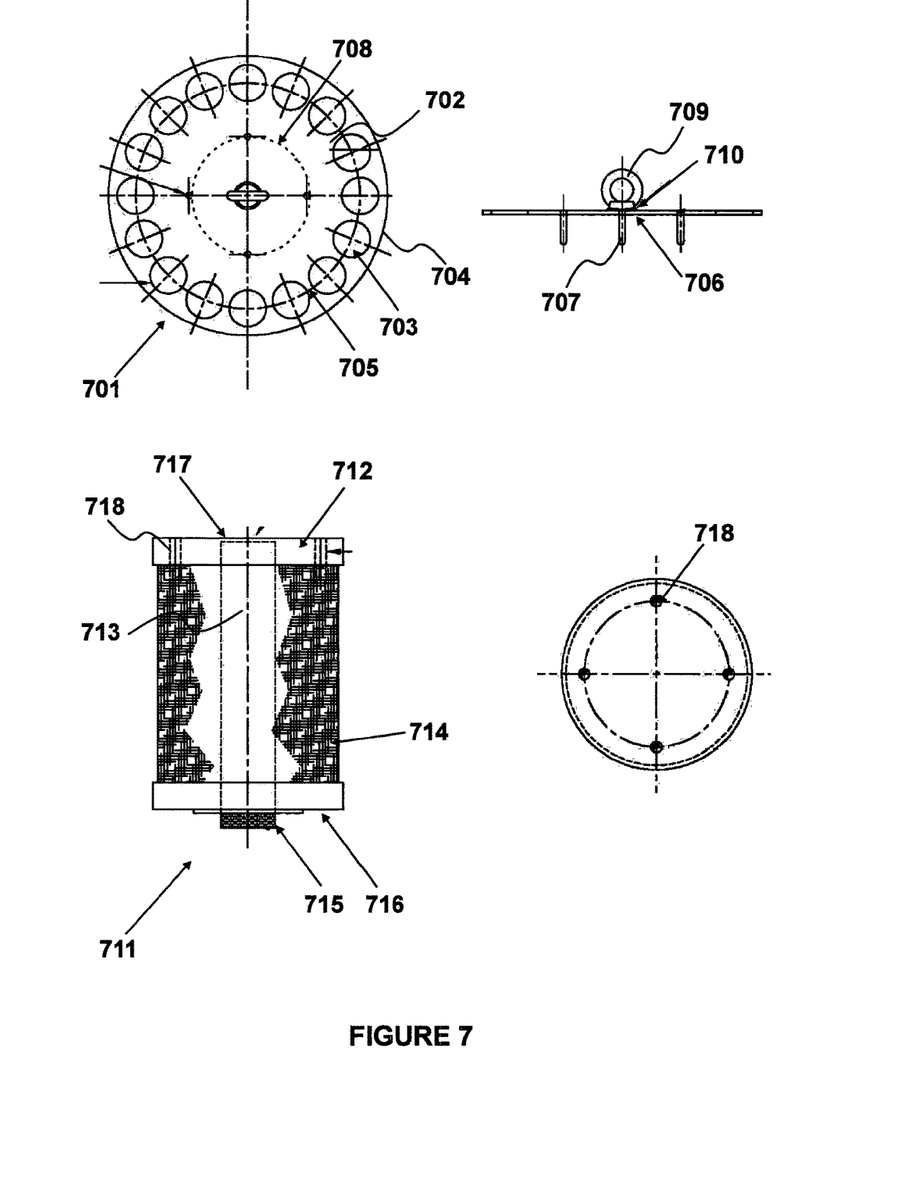
FIG. 7 shows an alternative baffle plate and alternative filter.

FIG. 7

FIG. 7 shows an alternative baffle plate 701. The baffle plate 701 is removably locatable within the vessel of a fluid treatment apparatus. The baffle plate 701 is substantially circular, to complement a circular cross-sectional shape of a vessel with which the baffle plate is to be used.

The baffle plate 701 has a solid central portion 702 and defines a plurality of apertures therein, such as aperture 703, spaced inwardly from the outer edge 704 thereof. In this example, the baffle plate 701 defines sixteen equally sized circular apertures, spaced equidistantly around a ring 705. It is to be appreciated however that the baffle plate may define a different number of apertures, which may be equally or differently sized, of any suitable shape and in any suitable arrangement.

In this embodiment, the baffle plate 701 comprises a plurality of locator legs, such as leg 706, extending from the underside 707 thereof. In this example, the baffle plate 701 defines four locator legs of equal length, spaced equidistantly around a ring 708. It is to be appreciated however that the baffle plate may comprise a different number of locator legs, in any suitable arrangement.

The baffle plate 701 further comprises a handle 709 on the upper side 710 thereof. In this example, the handle 709 is a lifting eye, located substantially centrally of the baffle plate 701. The handle 709 may take any suitable form and arrangement.

An alternative filter 711 is also shown in FIG. 7. The filter 711 is removably locatable within the vessel of a fluid treatment apparatus. The filter 711 is substantially circular, to complement a circular cross-sectional shape of a vessel with which the filter is to be used. The filter 711 is a cartridge filter having a sealed top 712 and defining a hollow central core 713 that is surrounded by filtration media 714.

In this embodiment, the filter 711 has a location spigot 715 at the lower end 716 thereof. The location spigot 715 is dimensioned to be located within the fluid outlet port at the lower end of a vessel with which the filter is to be used. This feature serves to stabilise the filter during installation and when in use.

In this embodiment, the upper end 717 of the filter 711 defines location openings, such as opening 718, for receiving the locator legs 706 of the baffle plate 701 therein. The number and arrangement of location openings in the upper end 717 of the filter 711 complements the number and arrangement of locator legs 706 of the baffle plate 701.

The filter may comprise any suitable filtration media and will typically have a fluid filter rating in the range 5-100 μm. The filter may be a 100 μm, 50 μm or 20 μm filter.

Figure 8:
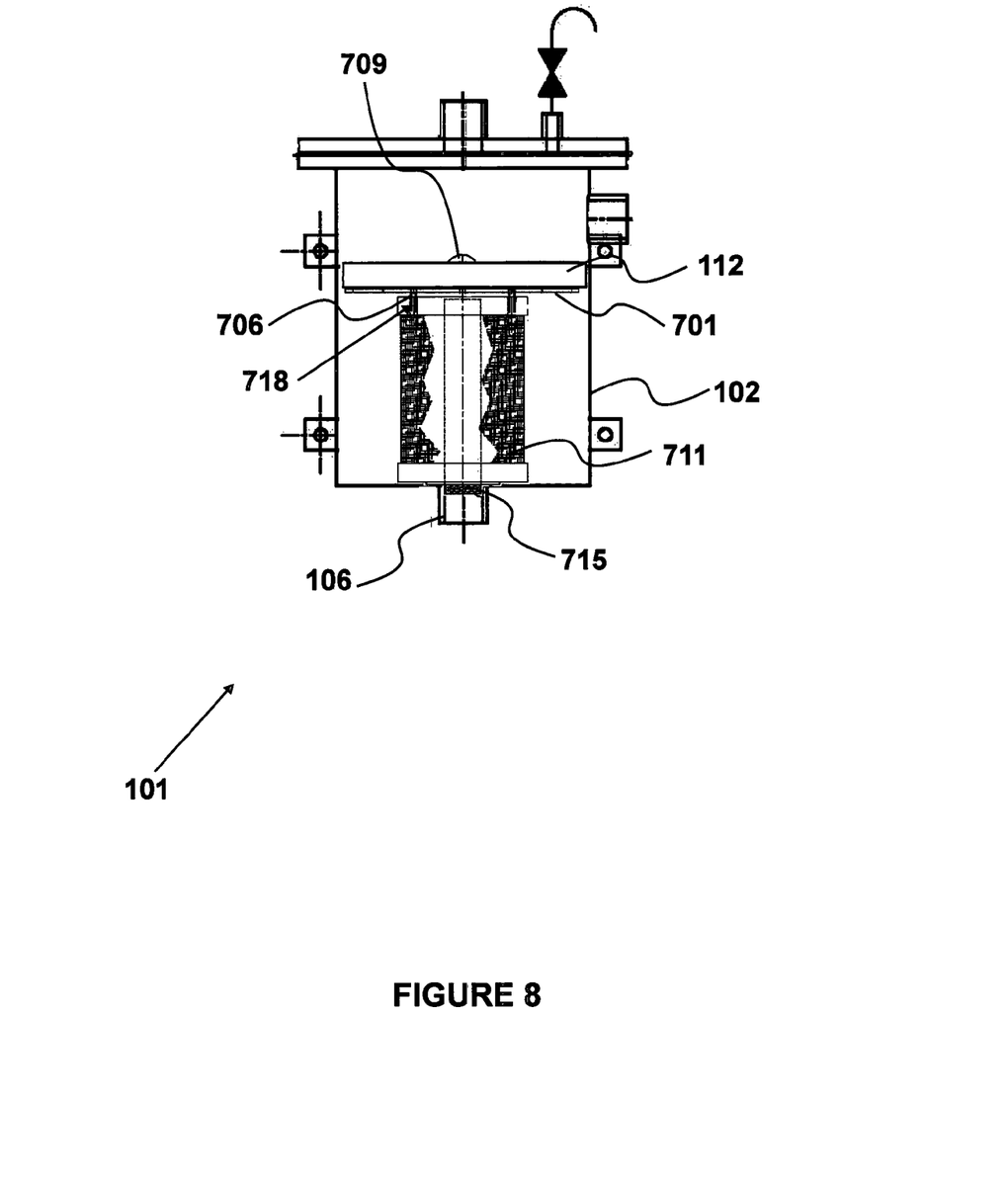
FIG. 8 shows the permanent magnet collector of FIG. 1, and the alternative baffle plate and alternative filter of FIG. 7, within the vessel of the fluid treatment apparatus of FIG. 1.

FIG. 8

FIG. 8 shows the permanent magnet collector 112, filter 711 and baffle plate 701 located within the vessel 102 of the apparatus 101.

In a method of installing the apparatus, the filter 711 is placed into the vessel 102 first, such that the spigot 715 is located within the fluid outlet port 106 of the vessel 102. The baffle plate 701 is then placed into the vessel 102 upon the filter 711, such that the locator legs 706 of the baffle plate 701 are located within the location openings 718. The permanent magnet collector 112 is then placed into the vessel 102 upon the baffle plate 701. In accordance with the specific examples, the handle 709 extends into the permanent magnet collector 112.

Thus, as shown in this Figure, the permanent magnet collector, filter and baffle plate are arranged within the vessel such that circulating fluid flowing through the vessel passes the permanent magnet collector and subsequently passes, along a path directed by the baffle plate, into the filtration media of the filter and out through the hollow central core of the filter and into the fluid outlet port of the vessel.

The illustrated arrangement provides a combination dosing and filtering unit.

A method of use of the fluid treatment apparatus described herein with circulating water of a sealed heating or cooling system will now be described. The fluid treatment apparatus is installed, and the vessel is used to dose the system water. The permanent magnet collector only is then located within the vessel, to purge the system water of metallic debris. After a period of time, for example 2 weeks, the permanent magnet collector is removed, and cleaned. Then the permanent magnet collector and a 100 μm filter are located within the vessel. The filter and permanent magnet collector are checked at regular intervals, for example each week, for contamination and cleanliness. When the 100 μm filter has been used, this is replaced with a 50 μm filter. The filter and permanent magnet collector are again checked at regular intervals, for example each week, for contamination and cleanliness. When the 50 μm filter has been used, this is replaced with a 20 μm filter. The incremental decrease in the filter size serves to polish the system water to restore cleanliness of the system water towards original cleanliness. The permanent magnet collector and filter are subsequently checked at regular maintenance intervals, and the permanent magnet collector cleaned and the filter replaced as required.

Figure 9:
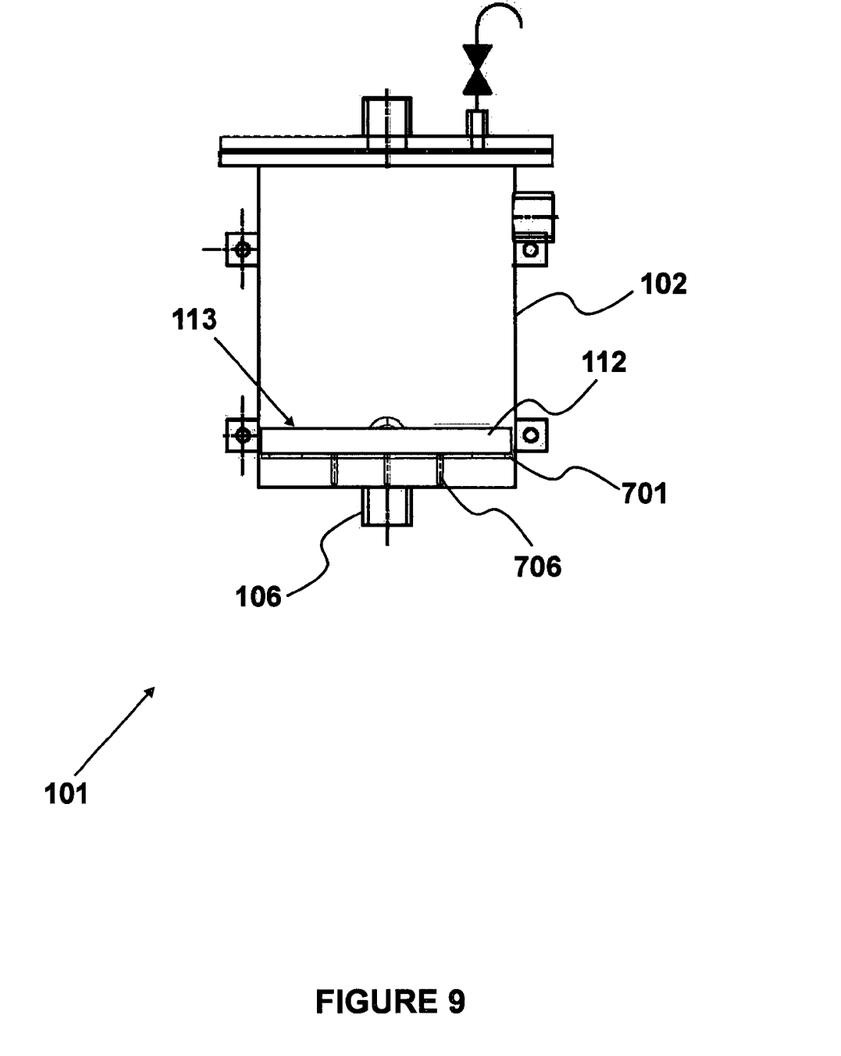
FIG. 9 shows the permanent magnet collector of FIG. 1, and the alternative baffle plate of FIG. 7, within the vessel of the fluid treatment apparatus of FIG. 1.

FIG. 9

FIG. 9 shows the permanent magnet collector 112, and baffle plate 701 located within the vessel 102 of the apparatus 101.

The baffle plate 701 is shown located within the vessel 102 such that the locator legs 706 thereof rest upon the internal floor of the vessel 102, and the permanent magnet collector 1 2 is shown located upon the baffle plate 701.

In the shown arrangement, the permanent magnet collector 112 is raised above the internal floor of the vessel 102 by the baffle plate 701. The baffle plate 701 acts to reduce the flow rate at which circulating system fluid exits the vessel 102, through the fluid outlet port 106, such that a low-flow region is formed above the baffle plate 701 in which the permanent magnet collector 112 is supported. The baffle plate 701 directs the circulating system fluid to exit the vessel 102 through the ring of apertures 703 defined therein, along exit flow paths near the internal walling of the vessel 102. With the baffle plate 701 and permanent magnet collector 12 arranged within the vessel 102 as shown in this Figure, the contact time of the circulating system fluid with the permanent magnet collector 112 in increased, across substantially whole of the area of the external collection surface 113. This serves to maximise the efficiency of the permanent magnet collector 112.

Figure 10:
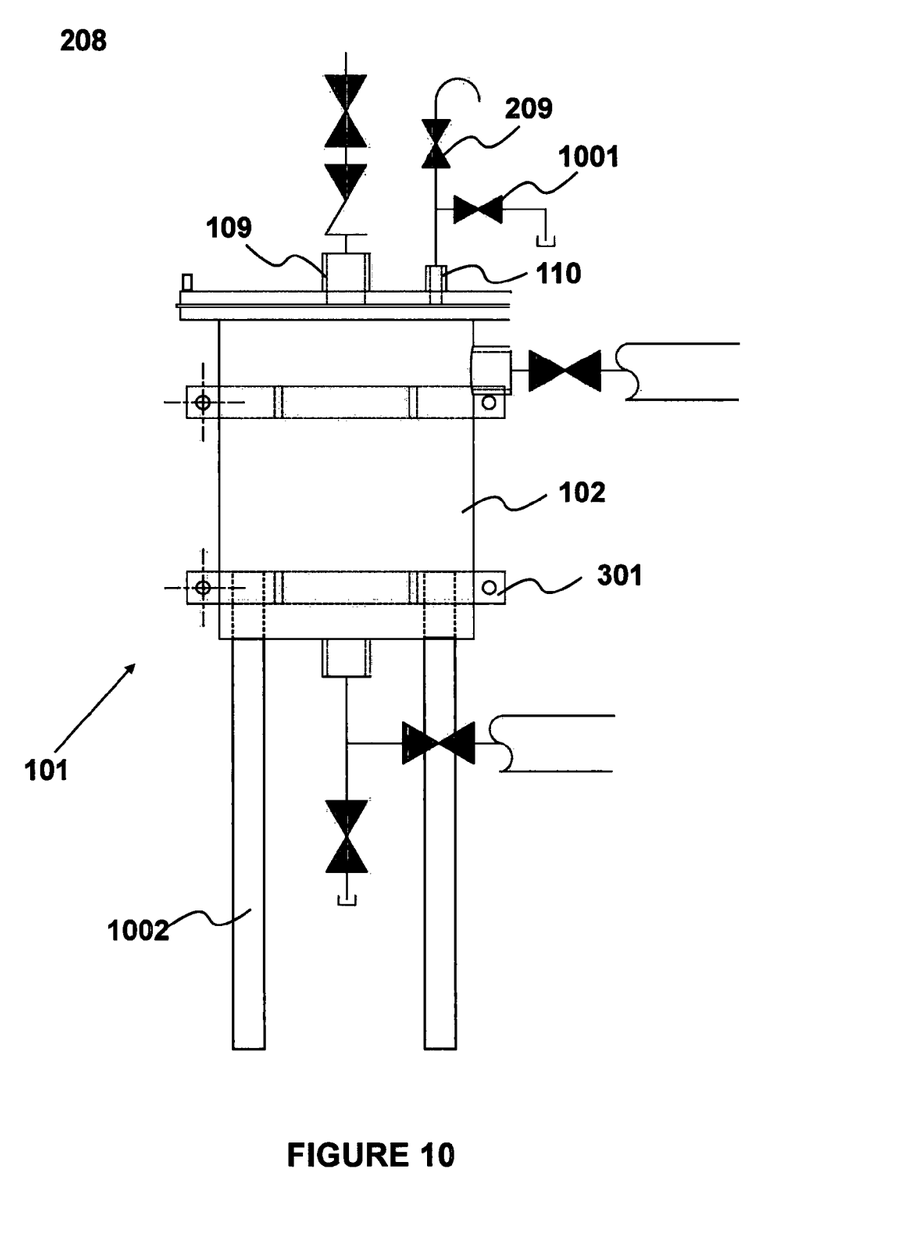
FIG. 10 shows further and/or alternative features of apparatus for use in the treatment of fluid in a fluid circuit of a heating or cooling system.

FIG. 10

The fluid treatment apparatus 101 may have further and/or alternative features to those previously described herein.

As shown in this Figure, the air vent port 110 is provided with a manually operable air vent 1001, upstream of the automatic air vent 209. In a method of dosing the circulating system fluid, the manually operable air vent 1001 is opened before a fluid treatment additive is introduced into the vessel 102 through the dosing port 109. The opening of the manually operable air vent 1001 acts to allow for faster introduction of fluid treatment additive into the vessel 102 and also acts to prevent introduced fluid treatment additive from entering the automatic air vent 209.

As shown in FIG. 10, the vessel 102 may be provided with at least one support leg 1002, for use in mounting the vessel upon a suitable support surface, such as a floor. A support leg may be provided in addition to, or as an alternative to, at least one bracket 301. One or more support legs may be provided for use with larger and heavier vessels, which require a greater degree of support than smaller and lighter vessels.

The fluid treatment apparatus described herein may thus be used to provide an initial single-stage filtration process (permanent magnet collector only) and then a double-stage filtration process (permanent magnet collector and filter), which can be modified over time to remove smaller and smaller sized contaminants from the circulating system fluid.

Advantages of the fluid treatment apparatus and method of the present invention include: dual dosing and filtering functionality, convenient installation, operation and maintenance, improved system circulation, improved efficiency of system, reduced risk of system failure, increased working life of system components, reduced maintenance costs.

The invention claimed is:

1. An apparatus arranged to be used in a treatment of fluid in a fluid circuit of a heating or cooling system, said apparatus comprising:
   a vessel defining an open upper end and comprising a lower end providing an internal floor of the vessel, the vessel defining a circulating fluid inlet port in a side wall thereof, for connection to a circulating fluid inflow conduit of the fluid circuit, and a fluid outlet port in the lower end thereof, for connection to a circulating fluid return conduit of the fluid circuit and a drain conduit, the fluid outlet port open through the internal floor of the vessel, said open upper end of said vessel provided with a removable lid defining a dosing port and an air vent port; and
   a permanent magnet collector arranged to collect magnetic particles on an external collection surface thereof, said permanent magnet collector removably locatable within said vessel;
   wherein, in use, fluid flowing through the vessel from the circulating fluid inflow conduit of the fluid circuit to the circulating fluid return conduit of the fluid circuit enters the vessel through the inlet port in the side wall of the vessel and exits the vessel through the fluid outlet port in the lower end of the vessel.

2. The apparatus of claim 1, wherein said dosing port is provided with a non-return valve.

3. The apparatus of claim 1, wherein said permanent magnet collector comprises a plurality of tubular housings, each housing a permanent magnet.

4. The apparatus of claim 3, wherein at least one end of each said tubular housing is provided with a removable cover for allowing the selective removal of said permanent magnet housed therein.

5. The apparatus of claim 3, wherein said tubular housings are relatively arranged in a form of a grate.

6. The apparatus of claim 1, wherein said permanent magnet collector comprises a handle.

7. The apparatus of claim 1, wherein the external collection surface of said permanent magnet collector is a non-magnetic surface.

8. The apparatus of claim 1, further comprising a filter removably locatable within said vessel.

9. The apparatus of claim 1, further comprising a baffle plate removably locatable within said vessel.

10. The apparatus of claim 1, wherein said air vent port is provided with an automatic air vent.

11. The apparatus of claim 1, further comprising a funnel releasably connectable to said dosing port.

12. The apparatus of claim 1, wherein said vessel is fabricated from stainless steel.

13. A method of installing fluid treatment apparatus in the fluid circuit of the heating or cooling system, comprising the steps of:
   a) receiving the apparatus of claim 1,
   b) locating said permanent magnet collector within said vessel,
   c) connecting said circulating fluid inlet port to the circulating fluid inflow conduit via an isolation valve, and
   d) connecting said fluid outflow port to the circulating fluid return conduit via an isolation valve, and to the drain conduit via an isolation valve.

14. The method of claim 13, further comprising the steps of:
   e) receiving a filter removably locatable within said vessel, said filter having an upper end and a lower end,
   f) receiving a baffle plate removably locatable within said vessel, said baffle plate having an upper side and an underside, and
   g) locating said permanent magnet collector, said filter and said baffle plate within said vessel such that said filter is lowermost, said permanent magnet collector is uppermost and said baffle plate is located between said filter and said permanent magnet collector, whereby circulating fluid flowing through said vessel passes said permanent magnet collector and subsequently passes through said filter.

15. The method of claim 14, wherein said filter has a location spigot at the lower end thereof, and step g) involves locating said location spigot of the filter within the fluid outlet port of the vessel.

16. The method of claim 14, wherein said baffle plate comprises a plurality of locator legs extending from the underside thereof, the upper end of said filter defines a plurality of location openings, and step g) involves locating the locator legs of said baffle plate within said location openings of the filter.

17. The apparatus of claim 1, wherein said apparatus further comprises the fluid circuit of the heating system.

18. The apparatus of claim 1, wherein said apparatus further comprises the fluid circuit of the cooling system.

19. A method of treating fluid in a fluid circuit of a heating or cooling system, said method comprising the steps of:
   a) identifying an apparatus, comprising:
      a vessel defining an open upper end and comprising a lower end providing an internal floor of the vessel, the vessel defining a circulating fluid inlet port in a side wall thereof, for connection to a circulating fluid inflow conduit of the fluid circuit, and a fluid outlet port in the lower end thereof for connection to a circulating fluid return conduit of the fluid circuit and a drain conduit, the fluid outlet port open through the internal floor of the vessel, said open upper end of said vessel provided with a removable lid defining a dosing port and an air vent port; and a permanent magnet collector arranged to collect magnetic particles on an external collection surface thereof, said permanent magnet collector removably locatable within said vessel, wherein, in use, fluid flowing through the vessel from the circulating inflow conduit of the fluid circuit to the circulating fluid return conduit of the fluid circuit enters the vessel through the inlet port in the side wall of the vessel and exits the vessel through the fluid outlet port in the lower end of the vessel, that is installed within the fluid circuit of the heating or cooling system, and b) performing at least one of:
(i) removing said permanent magnet collector from within said vessel, removing magnetic material collected on the external collection surface thereof and subsequently replacing the permanent magnet collector within said vessel; and
(ii) draining said vessel, introducing a fluid treatment additive into said vessel through said dosing port and subsequently allowing circulating fluid to flow through said vessel.

20. The method of claim 19, wherein said fluid is water.

* * * * *